United States Patent [19]

Saunders et al.

[11] Patent Number: 4,839,984
[45] Date of Patent: Jun. 20, 1989

[54] INSECT GUARD SYSTEM AND METHOD OF USE

[76] Inventors: Anne L. Saunders; John G. Fields, both of 3169 Murietta's Roost, Dorrington, Calif. 95223

[21] Appl. No.: 119,787

[22] Filed: Nov. 12, 1987

[51] Int. Cl.$^4$ ............................................. A01M 1/22
[52] U.S. Cl. .................................................... 43/112
[58] Field of Search .................... 43/112, 98, 107, 121

[56] References Cited

U.S. PATENT DOCUMENTS

| | | | |
|---|---|---|---|
| 2,401,815 | 6/1946 | Dalziel | 43/112 |
| 2,588,894 | 3/1952 | Taff | 43/112 |
| 2,647,228 | 7/1953 | Jwst | 43/112 |
| 3,504,892 | 4/1970 | Crist | 43/112 |
| 4,165,577 | 8/1979 | Shanahan et al. | |
| 4,186,512 | 2/1980 | Berg | 43/112 |
| 4,241,532 | 12/1980 | Fancy | 43/112 |

FOREIGN PATENT DOCUMENTS

| | | | |
|---|---|---|---|
| 432928 | 9/1967 | Switzerland | 43/112 |
| 443773 | 2/1968 | Switzerland | 43/112 |

Primary Examiner—Kurt Rowan
Attorney, Agent, or Firm—Flehr, Hohbach, Test, Albritton & Herbert

[57] ABSTRACT

A non-toxic, non-chemical device and system for repelling crawling insects from a structure such as a building and training the insects to go elsewhere includes closely-spaced elongated conductors mounted on an insulating base and having a potential difference applied thereto for providing a insect-stunning short-circuit current of about fifteen microamps. When insects bridge the conductors, they receive a current as a function of their internal resistance. The conductors are mounted via the base along the foundation and about posts and other structures which connect into the building. Preferably, the conductors are also slippery and reflective to assist in repelling and training the insects without bridging the conductors.

14 Claims, 5 Drawing Sheets

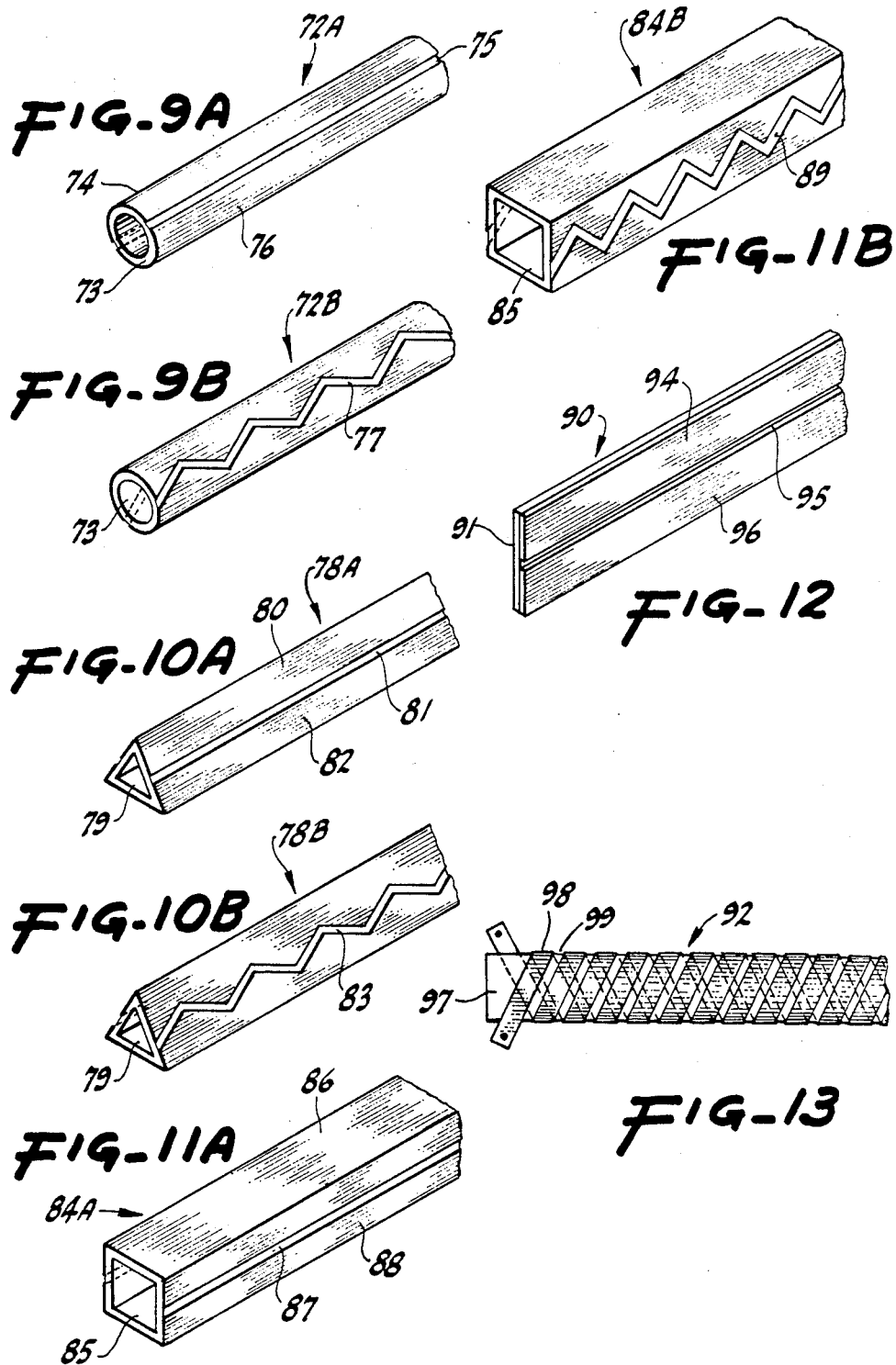

INSECT GUARD SYSTEM AND METHOD OF USE

BACKGROUND OF THE INVENTION

1. Field of the Invention

The present invention relates to the prevention of crawling insect infestation of structures such as buildings.

2. Background Information

Infestation by destructive and possibly diseased-carrying insects such as termites and cockroaches is a world-wide problem. In structures such as residential homes and commercial buildings, there are two aspects to the problem: elimination of an existing infestation and preventing infestation. To our knowledge, prevention usually involve spraying or coating chemical insecticides about the exterior periphery of the structure and, perhaps, inside structural components such as walls. Remedial attempts to rid structures of existing infestations take the form of spraying chemical insecticides, distributing chemical insecticide traps and systemic fumigation of a section of the structure or the entire structure.

Of the techniques used for prevention and elimination, chemical insecticides are probably the most effective, but require periodic and possibly frequent reapplication to maintain effectiveness. Also, insecticides are potentially toxic not only to the target pests, but also to non-targeted insects and to plant and animal life, including human life.

An electrical and mechanical alternative to chemical sprays, coatings and traps utilizes a molding-like trap structure which is applied along a wall baseboard and has spaced longitudinal conductor strips positioned along or over a curved trap-forming base section. An electrical potential difference is applied across the conductor strips, which typically are concealed by an elongated cover so that insects seeking concealment within the cover (for example, when lights are turned on) will straddle the conductors, be electrocuted by the associated potential difference and fall into the trap. While this structure is designed to avoid problems associated with the use of chemicals, nonetheless it does use high voltages of about 1800 volts and short circuit currents of about 6.5 milliamps which are noticeable to the human touch. In addition, presumably it is necessary to remove dead insects from the traps of this structure, which is designed to eliminate insect infestation after it occurs within a room, rather than prevent the occurrence of infestation.

SUMMARY OF THE INVENTION

1. Objects

Keeping in mind the above discussion of the characteristics and shortcomings of the prior art approaches for purposes of comparison, it is one primary object of the present invention to provide an insect repellent device and method of operation which are preventive or prophylactic in nature, rather than merely remedial, in that operation of the device prevents all manner of crawling insects such as termites, ants, cockroaches, spiders, caterpillars, centipedes and others from crawling upon or entering the protected structure.

It is a closely related object to provide such a device which does not kill the targeted insects, but rather trains or controls them so that they make other decisions as to where to crawl and live, thus leaving the protected structure free of infestation and damage.

It is another closely related object to provide such a protective device which uses absolutely no poisons or chemicals and will not shock human beings or animals when touched. In short, the object is to provide a device which is free of toxic elements and which poses no electrical shock hazard yet is efficacious in achieving its training/control function.

It is still another object to provide such a device which, relative to the purpose attained, i.e., the protection of an entire structure such as a residential or commercial building against entry of crawling insects, is relatively inexpensive to install and is simple to operate.

It is of yet another object to provide a device as described above which works continuously and without interruption.

2. Summary

In one aspect, our invention is embodied in a system for training and repelling crawling insects which comprises an elongated, flexible, electrically insulating substrate; a pair of elongated spaced conductors mounted on the substrate, the conductors being highly reflective and slippery; and power assembly means connected to the conductors for establishing a voltage differential providing a short-circuit current of about fifty microamperes to one microampere across the conductors, so that crawling insects are repelled from crossing the space conductors, preferably by a combination of reflected self-images, slipperiness, and shock caused by bridging the differential. In a presently preferred embodiment, our system includes a flexible screen base which mounts the flexible insulating substrate with the conductor side thereof facing outwardly. Preferably, the conductors are chromium and the insulative base is mylar.

In another aspect, our invention relates to a method for repelling crawling insects from crawling on and entering a protected structure such as a building without killing the insects and for training the insects to go elsewhere, comprising: mounting reflective, slippery, closely-spaced conductive strips about at least the peripheral base of the building for impeding the progress of insects across the strips; and establishing an electical potential between the conductors sufficient to provide a short-circuit current of about fifteen microamperes between the conductors and an associated stunning current through insects bridging the conductors which is dependent upon the internal resistance of the insect.

DESCRIPTION OF THE PREFERRED EMBODIMENTS

1. Overview

Figure 1:
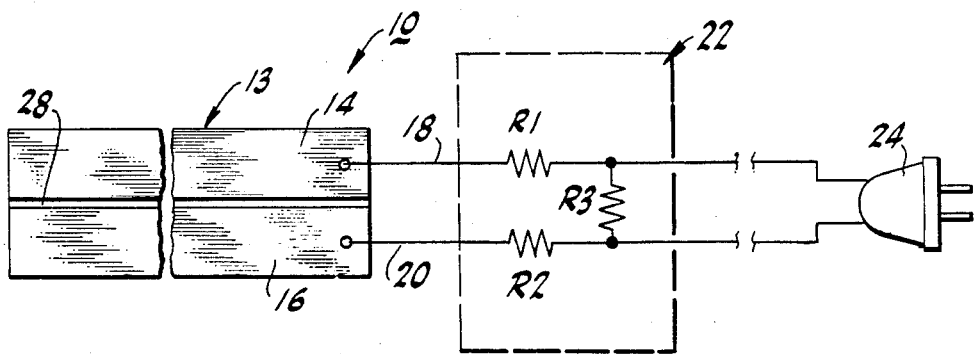

Referring to FIG. 1, in a presently preferred embodiment, our present insect guard system 10 includes a strip device 13 which is mounted about the lower external periphery of a protected structure such as a house or other building and which, as the result of a combination of electrical shock, slipperiness and reflected image, trains or controls crawling insects to go elsewhere.

The device 13 comprises an elongated strip or base 12 (FIG. 2) of non-conductive flexible material on which is formed or deposited spaced reflective, slippery, electrically-conducting strips 14 and 16. The strips are individually and separately connected by lines 18 and 20 to a power assembly box 22 which, in turn, is connected by a power plug 24 or other connector to a source of power such as a conventional AC outlet. Alternatively, the primary source of power can be a DC source such as a battery. In addition, a back-up power source such as a battery can be readily integrated into the circuit.

In a presently preferred basic version, the power assembly box 22 comprises three resistors: a four megohm resistor R1 connected in a series with one conductor 14, a four megohm resistor R2 connected in series with the second conductor 16, and a one megohm bridge or shunt resistor R3 connected across and on the source side of the series resistors R1 and R2. This arrangement provides a voltage to the strips 14 and 16 such that a short circuit current of about fifteen microamperes is delivered across the gap 28 between the two strips 14 and 16. Preferably, the base 12 is applied to the structure using a continuous bead of adhesive such as commercially available liquid nail so that there are no gaps between the base and the protected structure. Alternatively, however, other securing means such as nails or staples or tape can be used.

Please note, the components R1, R2 and R3 and the associated values are given by way of a preferred example for standard 120 volt, 60 cycle AC power sources. However, other resistor values can be used which are selected to provide the desired, very low value short-circuit current. In addition, the resistive components can be replaced by any impedances Z1, Z2, Z3 which deliver the desired low short-circuit current.

In use, and with the structure preferably applied along the base or foundation of the protected structure, when a crawling insect approaches the strip three factors combine to prevent that attempt and to discourage subsequent attempts.

First, the reflective nature of the material provides a self-image which may induce fear or anger due to the perception of another approaching insect, as well as frustration because of the inability to effectively challenge that insect.

Secondly, if the insect is not dissuaded from attempting to cross the conductors, the smooth, slippery surface of the conductor strip material such as chromium tends to render difficult any such attempt to cross, particularly for insects such as termites and cockroaches (this statement is based upon observation).

Thirdly, in the event that an insect does successfully initiate the crossing, upon contacting both strips simultaneously ("bridging" the strips), the insect will short-circuit the conductors and be stunned and fall off. Alternatively, if the insect is not stunned, it will respond to the stimulus by withdrawing.

If the insect again attempts to cross, it will encounter the same repellents, including ultimately the same electrical stimulus which will again stun it or force it to again withdraw. After repeated attempts to cross these strips and after being unable to do so, the insect will leave the area and seek other areas in the environment to live and find food and shelter. This result is accomplished without killing the insect, without the use of toxic chemicals, and without the use of electrical potential or current of sufficient value to pose discomfort or danger to the human touch. Also, one device is preventive and thus is more efficacious than existing remedial devices which merely alleviate or eliminate existing infestations.

2. Preferred Structure of Insect-Repelling Device 10

Figure 2:
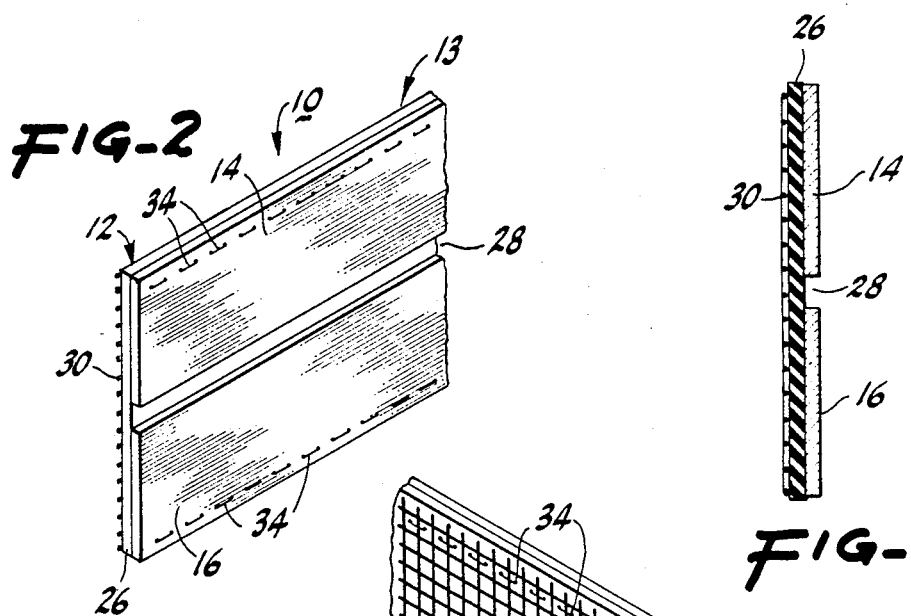
Figure 3:
Figure 4:
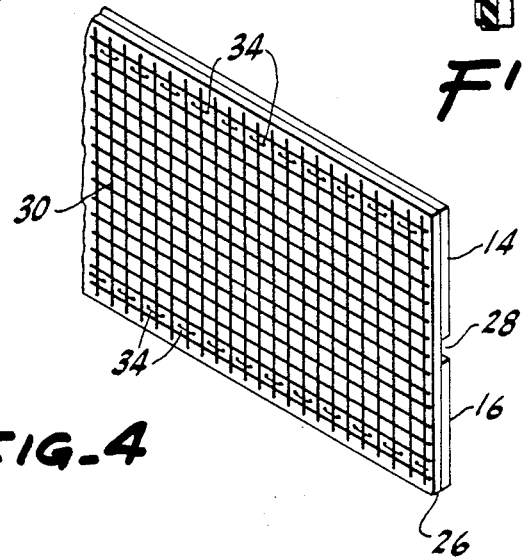

Referring to FIGS. 1–4 and in particular to FIGS. 2–4, as presently construed the protective device 10 comprises a variable length flexible strip or base 26 of material such as mylar which serves as a flexible insulating substrate for the conductive strips 14 and 16 of slippery, highly reflective material such as of chromium. The strips 14,16 are deposted or otherwise formed on the mylar substrate with a non-conductive gap or space 28 between the strips. A lightweight, flexible base 30 of material such as fiberglass screen or mesh is adhesively joined or sewn to the insulated backside of the flexible insulating substrate 26. The mesh or screen base 30 is then secured to the protected structure by adhesive or other joining means.

The particular composite structure integrates the dissimilar materials necessary to provide a flexible, durable, lightweight device which is easily fabricated and securely mounted and which controls/trains/repels insects by the preferred combination of slipperiness, reflection and electrical shock. That is, the highly reflective, slippery, conductive strips provide the desired repellent functions, while the fiberglass mesh or screen provides a flexible, durable base which is easily formed to size and readily attached to the protected structures of interest and the intermediate mylar base provides a flexible, durable easily sized intermediate mounting substrate for the specific conductors and is readily joined to the fiberglass base.

A presently preferred structure comprises a mylar strip 26 one to four inches wide (the width depends on the installation location and on the size of the insects in the locale) and two to four mils thick. Chromium conductor strips 14 and 16 are deposited one to four mils thick on the mylar base 26 with a 0.04 inch wide gap or space 28 between the strips. The mylar is sewn (the stitches 34 are most clearly shown in FIGS. 2 and 4) to the fiberglass base 30, which has approximately the same one to four inch width as the mylar base. The power assembly 22 comprises the above-mentioned resistors R1–R3 which provide a fifteen microamp short-circuit current across gap 28 for 120 volt, 60 cycle AC line voltage and are potted within a plastic case for protection against water and moisture. The device is connected via an AC cord or wire to the AC power plug 24, which is removably insertable into conventional AC outlets.

3. Installation Examples

Figure 5:
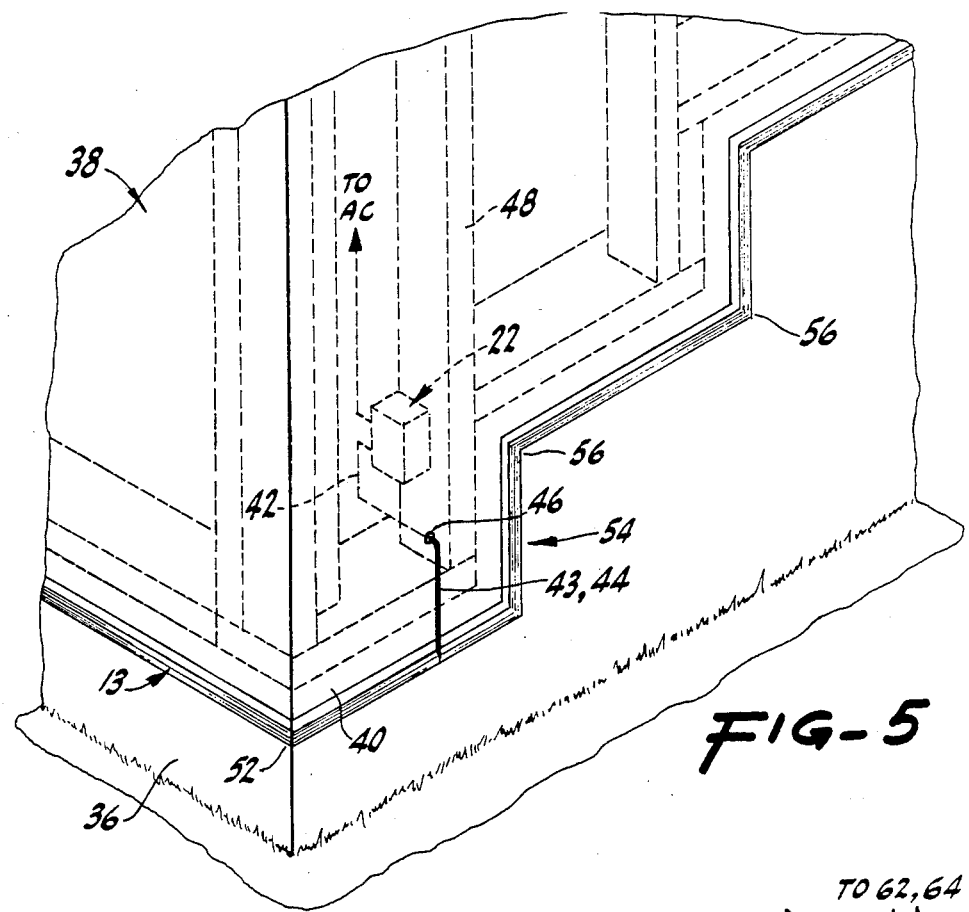
Figure 7:
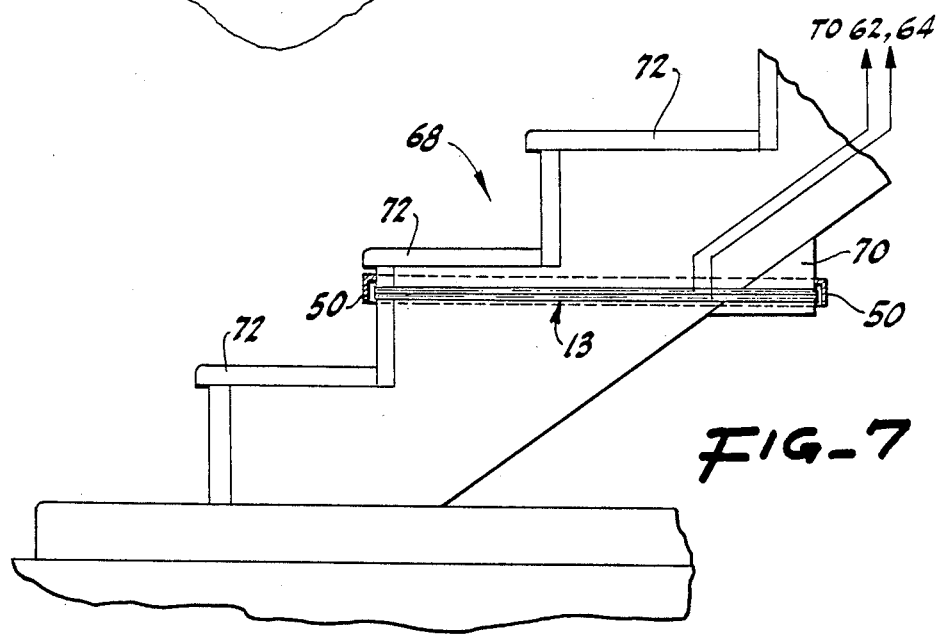
Figure 6:
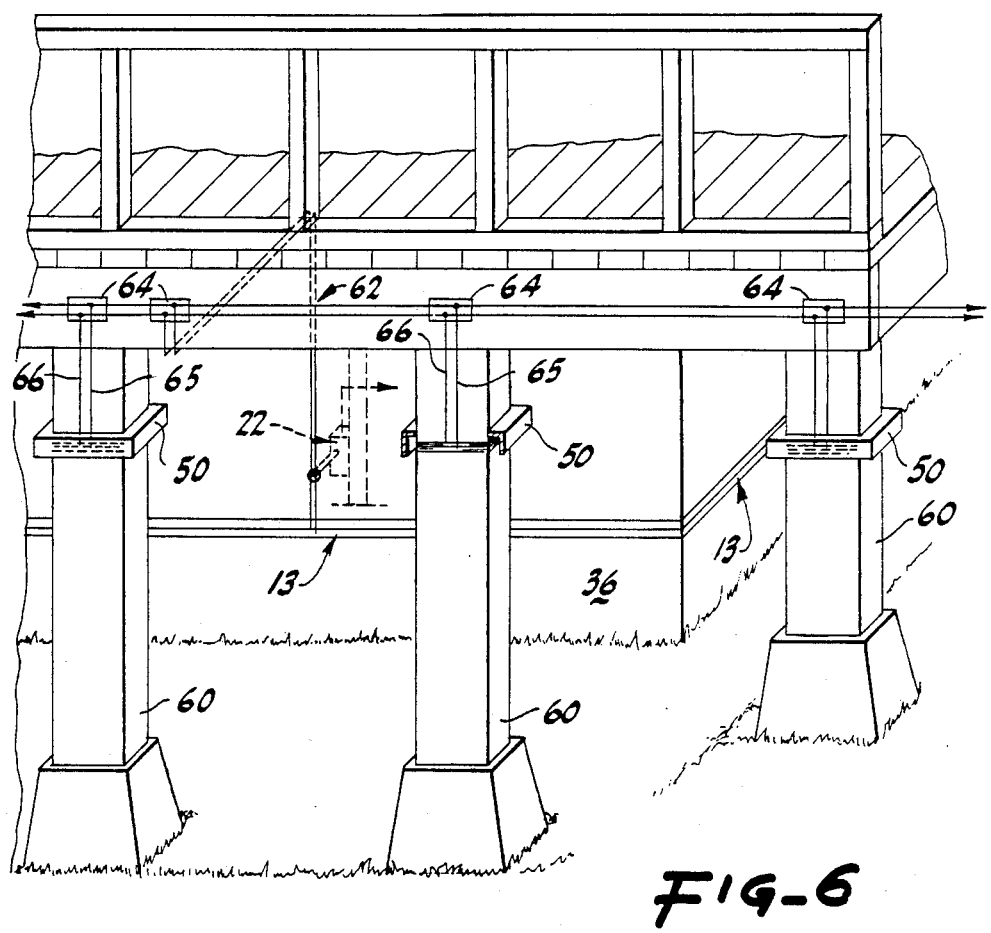

FIGS. 5–7 depict examples of typical installations of the protective device 10 on different structures.

FIG. 5 illustrates application to the exterior foundation 36 of a building 38. The protective strip 13 is installed at a preferred location which is just below the lowest outer-facing board 40 on the cement foundation 36. That is, the protective strip 13 is mounted by squeezing a running bead of liquid cement or other adhesive compound on the fiberglass screen side of the strip. Then, the protective strip 13 is positioned beneath and adjacent to the lowest board 40 or other facing material and is firmly pressed onto the foundation, adding more liquid cement as necessary to make the strip adhere to the foundation without leaving air gaps large enough to permit insects to pass through. The protective strips 13 are connected together, for example, by joining the conductor strips 14,16 (FIG. 2) using conductive adhesive and by sewing, stapling and/or gluing the underlying base 12 (FIG. 2) to thereby make electrical contact between the two ends of the strips and maintain continuity from strip-to-strip. Both the outside and inside of the foundation 36 should be protected in this manner.

Figure 8:
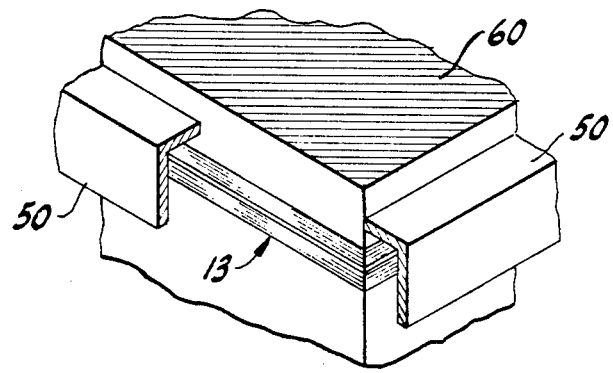

Electrical power connections are made using a connector strip 42 comprising two insulated wires 43,44 which are connected at one end intermediate the length of the strip 13 and extend through a subsequently sealed hole 46 in the wall to the power assembly box 22 which preferably is securely mounted to a framing stud 48 or other secure structural features. After the protective strip 13 is installed and checked for operation, shields, typically formed of L-shaped plastic, metal or wood covers 50, FIG. 8, are mounted using glue, nails, etc., over at least all exposed sections of the strip 13.

The weather/dust covers or shields 50 are installed to protect the system from rain, dew, ice, snow, dirt and dust build-up. The weather strips or covers 50 can be cut to customize the installation. Their size, i.e., width, can be varied to accommodate a particular geographic location and associated severity of weather. Also, preferably, water sealants will be applied on all joints between the covers 50 and the mounting structure and between abutting connecting structures to prevent leakage and possible ice damage to the protective strips.

The ability of the strip 13 to conform to structural features is illustrated by the corner bend 52 and by the stepped pattern 54 which is formed by prefabricating the stepped pattern out of strip material 13 connected as discussed above.

FIG. 6 depicts the installation of protective strips 13 on a building 58 having posts 60 which support a deck or balcony. Here, the protective strips 13 are mounted around the foundation 36 and around the periphery of all the supporting posts 60 (and around all other structures connected to the house or building). The separate protective strips 13 are interconnected by a distribution wiring system 62 which effectively serves as a bus which connects the individual power strips 13 to power assembly box(es) 22 using conventional moisture resistant terminal strips 64. The terminal strips connect to the distribution wiring system and facilitate connection of this system to the various branches of the device 13 via wiring 65,66. For installation, a terminal strip 64 is positioned at the desired location on the distribution wiring system 62 associated with a power strip 13. The wiring 65,66 is cut to the desired length and connected to the terminal strip and the terminal strip is snapped into place on the distribution wiring system. The other end of the wiring is connected to the associated protective strip 13 or to the power assembly box 22 using means such as a terminal strip and power assembly box 22 and connector. Preferably, the power assembly unit 22 will be attached near the foundation strip and convenient to the outside decking or other structural distribution points. Also, it is preferable but certainly not necessary that an alternating current outlet be close by to facilitate ease of installation.

FIG. 7 depicts the mounting of a protective strip 13 on stairs 68. A triangular block 70 is mounted to the sloping rear side of the stairs to provide a non-sloping, (vertical) rear surface which facilitates installation. The protective strip 13 is placed just beneath the steps 72 so that the circumferential cover 50 does not impede the use of the stairs. Preferably, the protective strip will be positioned as low as possible on the stairs to maximize the protected area and minimize access to the protected structure by crawling insects.

In addition to protecting the external posts 60, FIG. 6, internal posts such as those in a crawl space or basement which connect to and support the structure should be protected. Also, protective strips will be advantageously applied on foundations both under/inside the structure and outside the protected structure, on stairs, and in general on all structures connected to the house including but not limited to power, T.V. and telephone poles, and power, T.V. and telephone line entry points. Similarly, gas and water mains and meters coming out of the ground and entering the structure through or above the foundation should be protected by the strip devices 13. Regarding lines such as power, T.V. or telephone lines, if the insects are gaining access by way of such lines, the protective strips should be installed on the structure proper and not on the lines coming into the structure.

4. Other Structures and Configurations

FIGS. 9–15 illustrate various other geometrical configurations which can be used to present a differential current/voltage barrier to crawling insects.

FIG. 9A illustrates a protective strip 72A which has conductor strips 74 and 76 of metal or semiconductor or other suitable material formed on a tubular insulating base 73 and separated by straight gaps 75 between the conductor sections. The protective device 72B shown in FIG. 9B is similar except that zig-zag gaps 77 are used.

FIGS. 10A and 10B depict protective devices 78A and 78B which are triangular in cross-section. That is, the base 79 is triangular in cross-section. Longitudinal conductor sections 80 and 82 are formed on the base. Device 78A, FIG. 10A, has a straight non-conductive gap 81, whereas device 78B, FIG. 10B, has a zig-zag gap 83.

Similarly, FIGS. 11 and 11B depict conductors 84A and 84B, respectively, formed of a non-conductive insulating base 85 of rectangular cross-section and conductor strips 86 and 88 separated, respectively, by straight longitudinal gaps 87 and zig-zag longitudinal gaps 89.

FIG. 12 depicts a device 90 comprising, e.g., a base 91 of plastic or other suitable material such as masonite or fiberglass to which conductor strips 94 and 96 of metal or semiconductor material are joined as by laminating.

FIG. 13 depicts a protective device 92 formed by a tubular base 97 of circular cross-section on which a metal strip 98 is wound in a spaced spiral coil configuration with non-conductor gaps 99 being provided between the coils.

Figure 14:
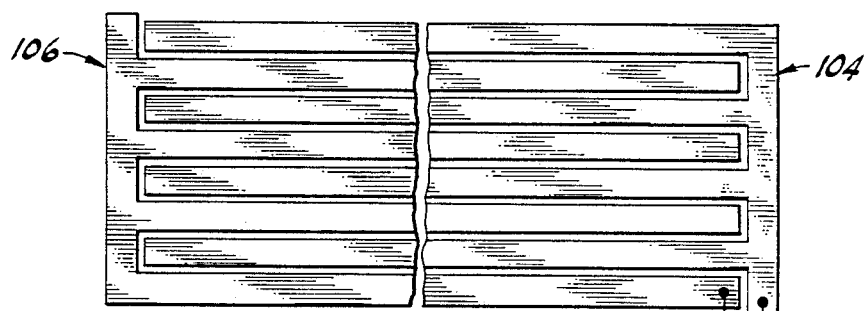

As shown in FIG. 14, interleaved conductors 104,106 can be used as the activated conductor strips. The interleaved conductors provide a wider straddle area and multiple points at which an insect has an opportunity to encounter the differential voltage/current. This interleaved conductor arrangement can be used in place of the arrangement of single, straight conductors 14,16, FIGS. 1–4, and 94,96, FIG. 12. In addition, the interleaved conductors can be manufactured in various geometric interleaving configurations, including but not limited to spiral, meander, triangular, circular or as one of the trigonometric functions such as the sine, cosine and tangent functions.

Figure 15A:
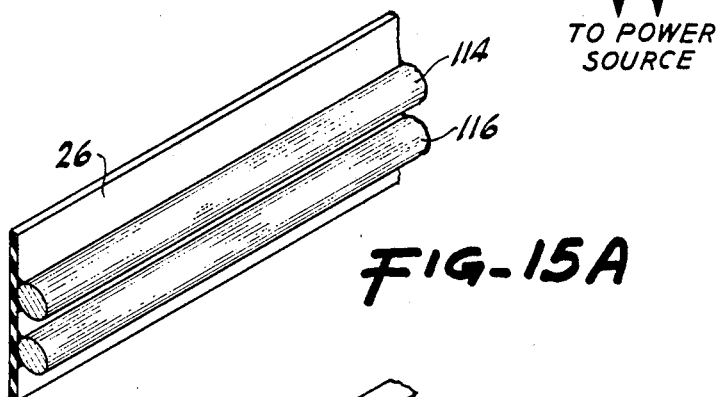
Figure 15B:
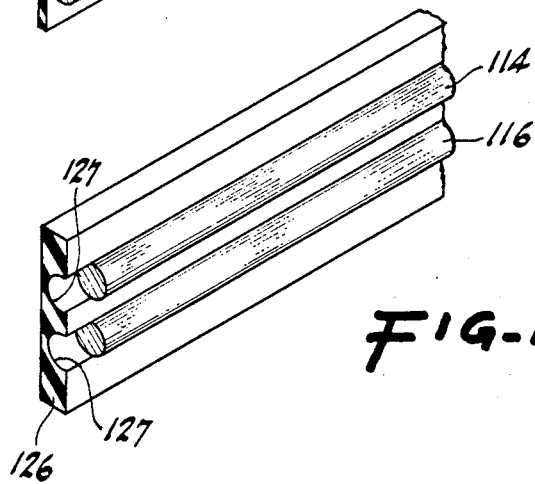

Referring to FIG. 15A, the activated conductors can also take the form of solid spaced wires 114,116 or semiconductor material which is thermally bonded, adhesively bonded, etc., to the substrate 26 of mylar or other suitable material. Alternatively, as shown in FIG. 15B, one can use a substrate 126 which is formed such as by molding, extrusion, etc., and has spaced grooves 127–127 which receive the conductors 114,116. The conductors can be bonded within the grooves or snapped into place as a friction fit.

It should be mentioned that while fifteen microamps is the presently preferred short-circuit current for crawling insects having body resistance of about 5-20 megohms, because of the combination of effectiveness and the large margin of safety provided by this value, there is sufficient safety tolerance to permit the safe use over a range of values from at least about fifty microamps to fifteen microamps or smaller.

A number of materials can be used as the substrates 26, 126, etc., with acceptable results. These include wood, plastics, fiberglass, masonite or other pressboard, metal, glass, screen, both metal and fiberglass, and any other material which will provide the requisite support to the active metal strips.

In addition to chromium, which is preferred, other materials which can be used as the active strip include all conductive metals, semiconductors laid on as a deposited material on a substrate, conductive paint on a substrate, electrolytic-deposited metals and semiconductors and sputtered metals and semiconductors. Although all such materials do not provide the optimum combination of slipperiness, reflectivity and conductivity a number of such other metals will provide sufficient conductivity alone to function adequately.

Numerous other modifications will be readily derived by those of usual skill in the art based upon the disclosure of the preferred and alternative embodiments here. For example, in addition to being mounted on the above materials, the system can be inlaid into existing wood or hard material such as cement, metal or brick. New construction architectural design can be readily adapted to the use of this system. Furthermore, the system can be used to protect a wide range of other structures such as power poles, and living and/or non-man made assets such as trees and other plants.

Thus, there has been described a crawling insect repellent device which uses a combination of imaging, slipperiness and low voltage, low current electric shock to repel crawling insects and to train/control them to go elsewhere, without killing the insects. Thus, our device is effective and avoids the mess associated with systems which kill insects, without the use of poisons or chemicals, and without any risk of shock to human beings or animals which touch the device. The electrical safety of the device has been demonstrated by placing a strip in a bathtub of water with a person sitting in the water and holding onto the strip with one hand and the faucet with the other. In this situation, one does not experience any sensation of shock whatsoever, due to the extremely low current and voltage. The system is safer than handling a standard nine-volt transistor radio battery. In addition, the system is simple to operate, inexpensive to install, lasts indefinitely (in contrast to the periodic replenishing or replacing required of conventional poison/chemical insecticides) and works continuously without interruption when properly installed.

Having thus described preferred and alternative embodiments of our invention, what is claimed is:

1. A system for training and repelling crawling insects, comprising: an elongated, flexible, electrically insulating substrate; a pair of elongated spaced conductors mounted on said substrate, said conductors being highly reflective and slippery; and power assembly means connected to said conductors for establishing a voltage differential providing a short-circuit current of about fifty microamps to about one microamp across said conductors, whereby crawling insects are repelled from crossing the spaced conductors by a combination of reflected images, slipperiness, and shock caused by bridging the voltage differential.

2. The system of claim 1, wherein the conductors comprise a multiplicity of longitudinally interleaved fingers.

3. The system of claim 1, wherein the substrate includes a pair of spaced longitudinal grooves and said conductors are mounted within said grooves.

4. The system of claim 1, wherein the substrate includes a pair of spaced longitudinal grooves and said conductors are mounted within said grooves in a friction fit therein.

5. The system of claim 1, 3 or 4, wherein the conductors are chromium.

6. The system of claim 1, further comprising a flexible screen base, said flexible insulating substrate being mounted on said flexible screen base with the conductor side thereof facing outwardly.

7. The system of claim 6, wherein the conductors comprise a multiplicity of longitudinally interleaved fingers.

8. The system of claim 6, wherein the substrate includes a pair of spaced longitudinal grooves and said conductors are mounted within said grooves.

9. The system of claim 6, wherein the substrate includes a pair of spaced longitudinal grooves and said conductors are mounted within said grooves and form a snap fit therein.

10. The system of claim 6, 8 or 9, wherein the conductors are chromium.

11. The system of claim 6, 8 or 9, wherein the conductors are chromium strips and the elongated, flexible, electrically insulating substrate is mylar.

12. A method for repelling crawling insects from crawling on and entering a protected structure such as a buildihg without killing the insects and for training the insects to go elsewhere, comprising: mounting closely-spaced electrically conductive strips along at least the base of the structure and circumferentially about other connected structures such as posts; and providing an electrical potential between the conductors sufficient to provide a short-circuit current of about fifteen microamperes to shock insects bridging the space between the conductors.

13. A method for repelling crawling insects from crawling on and entering a protected structure such as a building without killing the insects and for training the insects to go elsewhere, comprising: mounting reflective, slippery, closely-spaced conductive strips about at least the peripheral base of the building for impeding the progress of insects across the strips; and providing an electrical potential sufficient to provide a short-circuit current of about fifteen microamperes between the conductor strips across insects bridging the space between the electrically conductive strips.

14. A system for training and repelling crawling insects, comprising: an elongated, electrically insulating substrate; a pair of elongated spaced conductors mounted on said substrate; and power assembly means connected to said conductors for establishing a voltage differential providing a short-circuit current of about fifty microamps to about one microamp across said conductors, whereby crawling insects are repelled from crossing the spaced conductors by shock caused by bridging the voltage differential.

* * * * *